(12) United States Patent
Meganathan et al.

(10) Patent No.: US 11,617,149 B2
(45) Date of Patent: Mar. 28, 2023

(54) MOBILE APPLICATION BASED COMMISSIONING OF SMART CITY DEVICES

(71) Applicant: Honeywell International Inc., Charlotte, NC (US)

(72) Inventors: Deepak Sundar Meganathan, Bangalore (IN); Muthu Mariyappan G, TamilNadu (IN); Nellaivadivu Paphanasum, TamilNadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 65 days.

(21) Appl. No.: 17/188,854

(22) Filed: Mar. 1, 2021

(65) Prior Publication Data

US 2022/0279473 A1 Sep. 1, 2022

(51) Int. Cl.
*H04M 1/72409* (2021.01)
*H04W 64/00* (2009.01)
(Continued)

(52) U.S. Cl.
CPC ....... *H04W 64/003* (2013.01); *H04L 41/0806* (2013.01); *H04W 4/029* (2018.02)

(58) Field of Classification Search
CPC ..... H04W 12/08; H04W 4/00; H04W 12/033; H04W 4/02; H04W 4/021; H04W 4/029;
(Continued)

(56) References Cited

U.S. PATENT DOCUMENTS 8,725,298 B2    5/2014  Wallaert
8,994,591 B2 *  3/2015  Dupray ................. G01S 5/0257
                                                342/465
(Continued)

FOREIGN PATENT DOCUMENTS

DE    102007062914 A1    6/2009
WO    2016156401 A1     10/2016

OTHER PUBLICATIONS

Extended European Search Report, EP Application No. 22156074.1-1213, European Patent Office, dated May 17, 2022 (8 pages).
(Continued)

*Primary Examiner* — Joseph Arevalo
(74) *Attorney, Agent, or Firm* — Seager, Tufte & Wickhem, LLP

(57) ABSTRACT

A plurality of smart city devices are configured using an application running on a mobile device. The method includes installing a particular smart city device and automatically identifying a geo-location of the particular smart city device by identifying a current geo-location of the mobile device using a location service of the mobile device. Configuration information for the particular smart city device is entered using a user interface of the mobile device. The geo-location and the configuration information of the particular smart city device are saved in the mobile device. The installing, entering, recognizing and storing steps are repeated for each of a number of the plurality of smart city devices. The saved geo-location and the configuration information for each of the number of smart city devices are uploaded from the mobile device to a remote server.

17 Claims, 9 Drawing Sheets

(51) Int. Cl.
*H04W 4/029* (2018.01)
*H04L 41/0806* (2022.01)

(58) Field of Classification Search
CPC ........... H04W 4/06; H04W 4/08; H04W 4/33; H04W 4/70; H04W 4/80; H04W 4/90; H04W 40/22
USPC ... 455/3.01, 456.1, 456.2, 414.1, 41.1, 66.1, 455/456.3, 411, 404.1, 566
See application file for complete search history.

(56) References Cited

U.S. PATENT DOCUMENTS

| | | | |
|---|---|---|---|
| 9,588,514 | B2 | 3/2017 | Christensen et al. |
| 9,719,887 | B2 | 8/2017 | Ratilla et al. |
| 9,736,699 | B1* | 8/2017 | Rao ................. H04W 28/08 |
| 2003/0101108 | A1 | 5/2003 | Botham et al. |
| 2004/0215669 | A1 | 10/2004 | Mettala et al. |
| 2006/0087402 | A1 | 4/2006 | Manning et al. |
| 2006/0282498 | A1 | 12/2006 | Muro |
| 2007/0030841 | A1* | 2/2007 | Lee ........................ G01S 19/17 370/352 |
| 2007/0037522 | A1 | 2/2007 | Liu et al. |
| 2009/0313225 | A1 | 12/2009 | Nordlinger |
| 2010/0005382 | A1 | 1/2010 | Curran et al. |
| 2011/0087988 | A1 | 4/2011 | Ray et al. |
| 2011/0118880 | A1 | 5/2011 | Diwakar et al. |
| 2011/0177797 | A1* | 7/2011 | Vendrow ............... H04W 12/08 455/414.1 |
| 2012/0063354 | A1 | 3/2012 | Vanga et al. |
| 2012/0299747 | A1 | 11/2012 | Schubert et al. |
| 2012/0330849 | A1 | 12/2012 | Nielsen et al. |
| 2013/0073690 | A1 | 3/2013 | DeSalvo et al. |
| 2013/0179354 | A1 | 7/2013 | Seat |
| 2014/0061293 | A1 | 3/2014 | Jayaprakash et al. |
| 2014/0129277 | A1 | 5/2014 | Lavrov et al. |
| 2014/0262130 | A1 | 9/2014 | Yenni et al. |
| 2014/0262134 | A1 | 9/2014 | Arenmeiser et al. |
| 2014/0266639 | A1 | 9/2014 | Zises |
| 2014/0266755 | A1 | 9/2014 | Arenmeiser et al. |
| 2014/0282257 | A1 | 9/2014 | Nixon et al. |
| 2014/0358285 | A1 | 12/2014 | Aggarwal et al. |
| 2015/0169791 | A1 | 6/2015 | Lavrov et al. |
| 2016/0100437 | A1 | 4/2016 | Armstrong et al. |
| 2016/0132046 | A1 | 5/2016 | Beoughter et al. |
| 2016/0327296 | A1 | 11/2016 | Leising et al. |
| 2017/0325056 | A1* | 11/2017 | Mehta .................... H04M 11/04 |
| 2018/0012173 | A1 | 1/2018 | Leen et al. |
| 2019/0065855 | A1* | 2/2019 | Lerman ..................... G06T 7/70 |
| 2019/0107845 | A1* | 4/2019 | Kaine ...................... G05D 1/104 |
| 2019/0158789 | A1* | 5/2019 | Snyder .................... G06V 40/20 |
| 2019/0342357 | A1* | 11/2019 | Mitic .................. H04L 67/1097 |
| 2020/0109029 | A1 | 4/2020 | Pahlke et al. |
| 2020/0120458 | A1* | 4/2020 | Aldana .................. H04W 4/08 |
| 2020/0162724 | A1* | 5/2020 | Neser ...................... G01S 19/01 |
| 2020/0213193 | A1* | 7/2020 | Newell .................... H04W 4/70 |
| 2021/0274462 | A1* | 9/2021 | Wiacek ................ G01S 5/0218 |

OTHER PUBLICATIONS

International Search Report and Written Opinion from related PCT Application No. PCT/US2017/038736, dated Oct. 17, 2017, 12 pages.
European Office Action, Application No. 17824697.1, pp. 4, dated Oct. 6, 2020.
"AMS Suite: Intelligent Device Manager with the DeltaV™ System", http://www2.emersonprocess.com/siteadmincenter/PM%20As~set%20Optimization%20Documents/ProductDataSheets/amsdm_ds_amsdeltav.PDF, Apr. 2015, 5 pp.

* cited by examiner

MOBILE APPLICATION BASED COMMISSIONING OF SMART CITY DEVICES

TECHNICAL FIELD

The present disclosure relates generally to commissioning of smart city devices. More particularly, the present disclosure relates to using a mobile application in commissioning of smart city devices.

BACKGROUND

Smart cities can include a large number of smart city devices such as cameras and other security and sensing devices. Once each of the smart city devices are installed, they need to be configured or commissioned. It will be appreciated that a smart city may include hundreds or even thousands of smart city devices. Configuring each of these smart city devices can be a lengthy, time-consuming process in which errors can easily occur. When configuring smart city devices, it is important to know the actual installed location of each smart city device, as well as other information regarding each device. Unfortunately, many smart city devices do not include geo-location services. What would be desirable are methods and system for using a mobile device to configure each of the installed smart city devices easily, including the actual installed location, even when the Command and Control (CC) system for the smart city is not yet setup and online.

SUMMARY

The present disclosure relates to using a mobile application in commissioning of smart city devices. In one example, a method provides for configuring a plurality of smart city devices using an application running on a mobile device that includes a user interface and a memory. The illustrative method includes installing a particular smart city device of the plurality of smart city devices and automatically identifying a geo-location of the particular smart city device by identifying a current geo-location of the mobile device using a location service of the mobile device. Configuration information for the particular smart city device is entered using a user interface of the mobile device. The geo-location and the configuration information of the particular smart city device are saved in the mobile device. The installing, entering, recognizing and storing steps are repeated for each of a number of the plurality of smart city devices. The saved geo-location and the configuration information for each of the number of smart city devices are uploaded from the mobile device to a remote server, sometimes to a Command and Control (CC) system hosted by the remote server.

In another example, a method provides for configuring a smart city device using an application running on a mobile device that includes a user interface and a memory. The method includes installing a smart city device and capturing configuration information for the smart city device using the user interface of the mobile device. A GPS position of the smart city device is automatically recognized by capturing a current GPS position of the mobile device. The GPS position and the configuration information are saved to the memory of the mobile device. The saved GPS position and the configuration information for the installed smart city device are uploaded to a remote server.

In another example, a non-transient, computer-readable storage medium has executable instructions stored thereon. When the executable instructions are executed by one or more processors of a mobile device, the mobile device is caused to capture configuration information for a smart city device entered using a user interface of the mobile device and to automatically recognize a GPS position of the smart city device by capturing a current GPS position of the mobile device. The mobile device is caused to save the GPS position and the configuration information to the mobile device and to upload the saved GPS position and the configuration information for the installed smart city device to a remote server.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
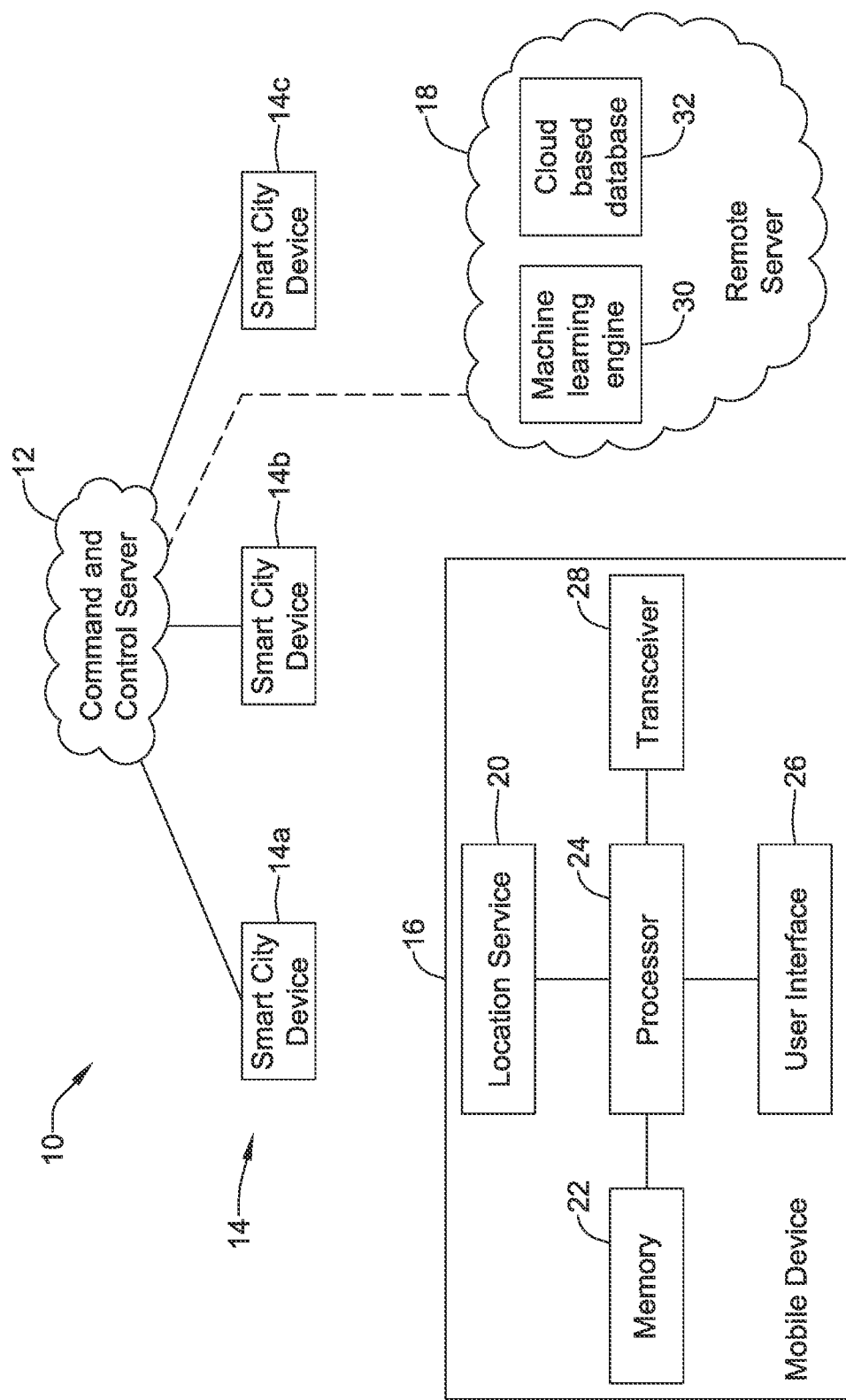
FIG. 1 is a schematic block diagram of an illustrative smart city system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative smart city system 10. The illustrative smart city system 10 includes a Command and Control (CC) server 12 that is operably coupled with a plurality of smart city devices 14. The smart city devices 14 are individually labeled as 14a, 14b and 14c. While only three smart city devices 14 are shown, it will be appreciated that this is merely illustrative, as the smart city system 10 may include any number of smart city devices 14, and will likely include a substantially greater number of smart city devices 14. Each of the smart city devices 14 may individually represent a video camera or other security device such as a microphone or a shot spotter, a street light sensor, a parking sensor, an automotive sensor, a vehicle tracking device, garbage bin detector, and the like. Some of the smart city devices 14 may include a separate controller that controls operation of the smart city device 14. At least some of the smart city devices 14 may be controlled by the CC server 12 and/or may provide operational data to the CC server 12.

While the CC server 12 is illustrated as being cloud-based, this is not necessarily so. In some cases, the CC server 12 may actually be one or more computer servers or other computing devices that are operably coupled with the plurality of smart city devices 14. The CC server may be disposed within or otherwise coupled with a smart city command center (not shown) in which individuals track a variety of activities within the smart city. For example, individuals may track traffic, noise, crowd and/or crowd behavior, air pollution, fire, security concerns, and/or other conditions within the smart city. The smart city command center may include a video wall for displaying a variety of videos from video cameras disposed about the smart city, as well as other collected data and/or alarms. These are just examples.

In setting up the smart city, each of the smart city devices 14 needs to be installed and configured. It is contemplated that configuring the smart city devices 14 can include using a mobile device 16 both for ascertaining the actual installed location of each of the smart city devices 14 as they are installed, as well as enabling an installer to manually enter a variety of configuration settings and parameters using the mobile device 16. Once the appropriate configuration information for each of the smart city devices 14 has been captured by the mobile device 16, including the installed location, the mobile device 16 can upload the captured configuration information to a remote server 18. In some cases, the remote server 18 may ultimately provide the configuration information for each of the smart city devices 14 to the CC server 12. In some instances, the remote server 18, which can communicate with the CC server 12 but is separate from the CC server 12, may include a machine learning engine 30 and a cloud-based database 32. In some instances, the remote server 18 may actually be part of the CC server 12. The purposes of both the machine learning engine 30 and the cloud-based database 32 will be discussed subsequently.

The mobile device 16 may be a tablet or smartphone, for example, and may include a variety of components that enable the mobile device 16 to be used to help in configuring the smart city devices 14. For example, the mobile device 16 may include location services 20 that may be used to ascertain a current geo-location or geographical location of the mobile device 16. By determining where the mobile device 16 itself is when the installer is installing a particular smart device, an application running on the mobile device 16 is able to ascertain the installed location of the particular smart city device 14. The location services 20 may include, for example, one or more of Global Positioning System (GPS), cellular triangulation between cell towers, Bluetooth beaconing and Wi-Fi beaconing.

In the example shown, the mobile device 16 includes a memory 22. The memory 22 may be used to store configuration information. The memory 22 may be configured to store an executable application that when executed by a processor 24, causes the mobile device 16 to carry out the appropriate steps to help in configuring the plurality of smart city devices 14. The mobile device 16 also includes a user interface 26. The user interface 26 may include a display of the mobile device 16. The mobile device 16 may include a keyboard that is displayed on the display and that is touch-sensitive. The mobile device 16 may be sensitive to a person sliding their finger around the displayed keyboard, much in the way that this technique can be used when texting. The user interface 26 may include a voice interface, that allows a person to enter information by talking to the mobile device 16. The mobile device 16 may include a camera that may be considered as being part of the user interface 26, since the camera may be used to provide information to the mobile device 16.

The mobile device 16 also includes a transceiver 28 that allows the mobile device 16 to communicate with other devices. The transceiver 28 may be configured to allow the mobile device 16 to communicate over cellular networks, for example. In some cases, the transceiver 28 may also be configured to communicate via other wireless communication protocols, such as but not limited to Bluetooth and/or Wi-Fi. The transceiver 28 may represent two or more distinct transceivers, each configured to communicate via a different wireless communication protocol.

An illustrative process for using the mobile device 16 to assist in configuring the plurality of smart city devices 14 includes an installer or other person tasked with configuring each of the plurality of smart city devices 14 traveling or otherwise being adjacent a particular smart city device 14. It will be appreciated that the plurality of smart city devices 14 may all be configured by a single installer using a single mobile device 16. In some cases, the plurality of smart city devices 14 may be divided into groups, with each group assigned to a particular installer having their own mobile device 16. In either event, an installer uses the mobile device 16 to determine the current position of the mobile device 16 and thus an application running on the mobile device 16 can capture that current position and assign that current position as the actual installed position or location of the particular smart city device 14.

The installer can then use the user interface 26 of the mobile device 16 to enter other configuration details such as but not limited to a name of the particular smart city device 14, an IP address of the particular smart city device 14, a Media Access Control (MAC) address of the particular smart city device 14, and any other desired details. The mobile device 16 can store the configuration details for that particular smart city device 14 in the memory 22 of the mobile device 16 until such time as the mobile device 16 is able to communicate with the remote server 18. This allows configuration of the smart city devices 14 without requiring immediate network access to the remote server 18, for example, and/or before the remote server 18 and/or the CC server 12 is able to accept information. In some cases, the mobile device 16 can communicate with the particular smart city device 14 being installed, such as via Bluetooth and/or Wi-Fi. When so provided, at least some of the configuration information collected by the mobile device (e.g. IP address) may be sent to the particular smart city device 14 to configure the smart city device.

Figure 2:
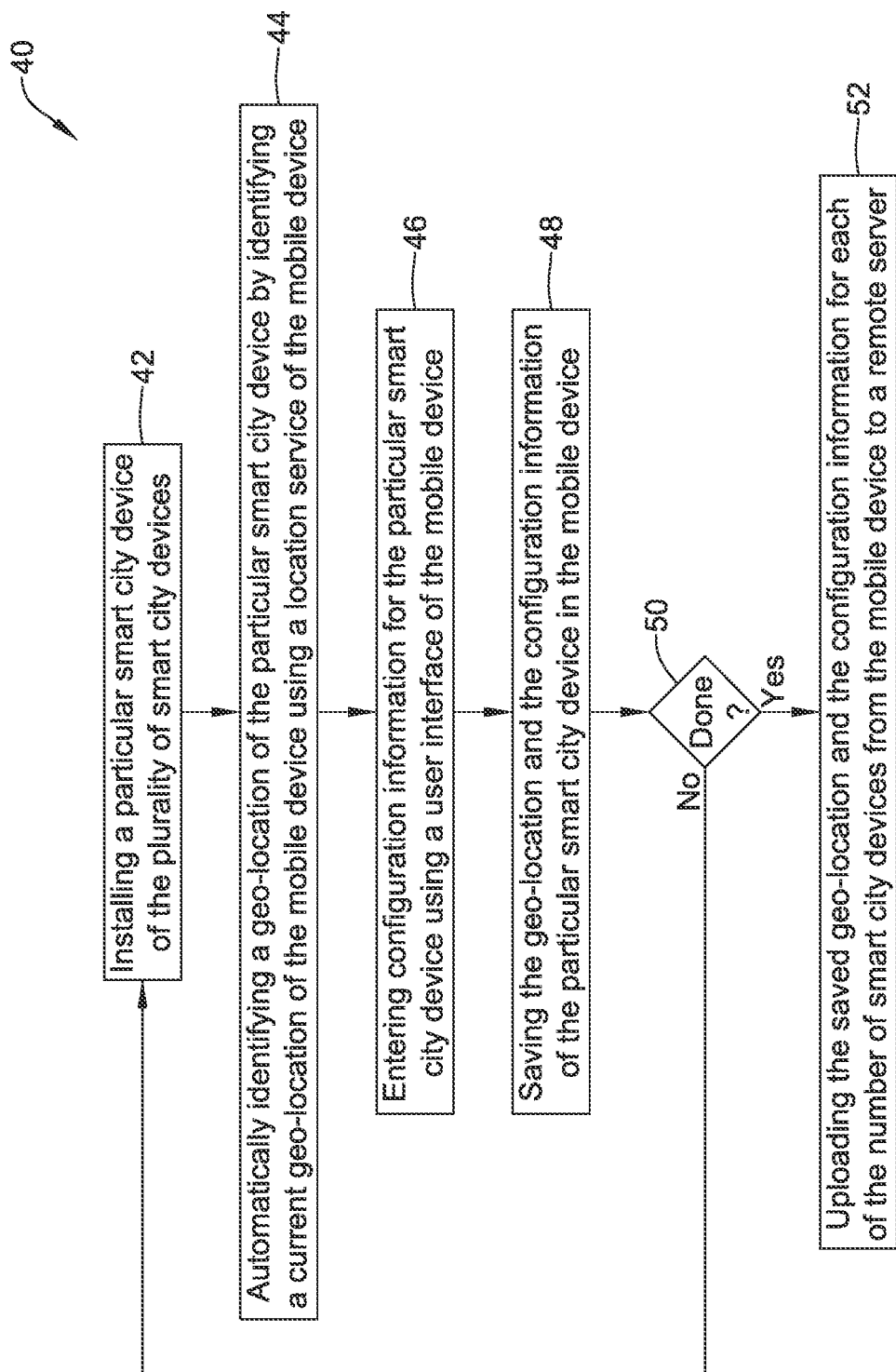
FIG. 2 is a flow diagram showing an illustrative method of configuring a plurality of smart city devices.

FIG. 2 is a flow diagram showing an illustrative method 40 of configuring a plurality of smart city devices (such as the smart city devices 14) using an application running on a mobile device (such as the mobile device 16). In some cases, at least some of the smart city devices may be security cameras or access control devices. The illustrative method 40 includes installing a particular smart city device of the plurality of smart city devices, as indicated at block 42. A geo-location of the particular smart city device is automatically identified by identifying a current geo-location of the mobile device using a location service of the mobile device, as indicated at block 44. The location services of the mobile device may use one or more of GPS, cellular triangulation, Bluetooth and Wi-Fi to identify the current geo-location of the mobile device, and thus the geo-location of the particular smart city device. In some cases, the geo-location is a GPS position.

Configuration information for the particular smart city device is entered using a user interface (such as the user interface 26) of the mobile device, as indicated at block 46. The geo-location and the configuration information of the particular smart city device are saved in the mobile device, as indicated at block 48. The configuration information for the particular smart city device may, for example, include one or more of a device name, a device type, a MAC address, an IP address, an installer note, an image upload from the particular smart city device (e.g. via a wired, Bluetooth or Wi-Fi connection with the particular smart city device), a video upload from the particular smart city device, an audio upload from the particular smart city device, a device specific test data, and one or more details regarding an installer of the particular smart city device (e.g. installer name, installer contact information, vendor name, etc.).

At decision block 50, a determination is made as to whether all of the smart city devices have been configured. This determination may be made by the user, for example. If not, control reverts back to block 42 and the process continues with installation of another smart city device. However, if at decision block 50 the determination is made that all of the smart city devices have been configured, control passes to block 52, where the saved geo-location and the configuration information for each of the number of smart city devices are uploaded from the mobile device to the remote server (such as the remote server 18). In some cases, the installing step (block 42), the automatically identifying step (block 44), the entering step (block 46) and the saving step (block 48) may be performed for each of the smart city devices before the remote server 18 is online or is otherwise available to receive the uploaded information. In some instances, the saved geo-location and the configuration information are uploaded to the remote server 18 before moving on to the next smart city device. In some instances, the uploading step (block 52) occurs when the mobile device is connected to the remote server through a Wide Area Network (WAN). These are just examples.

Figure 3:
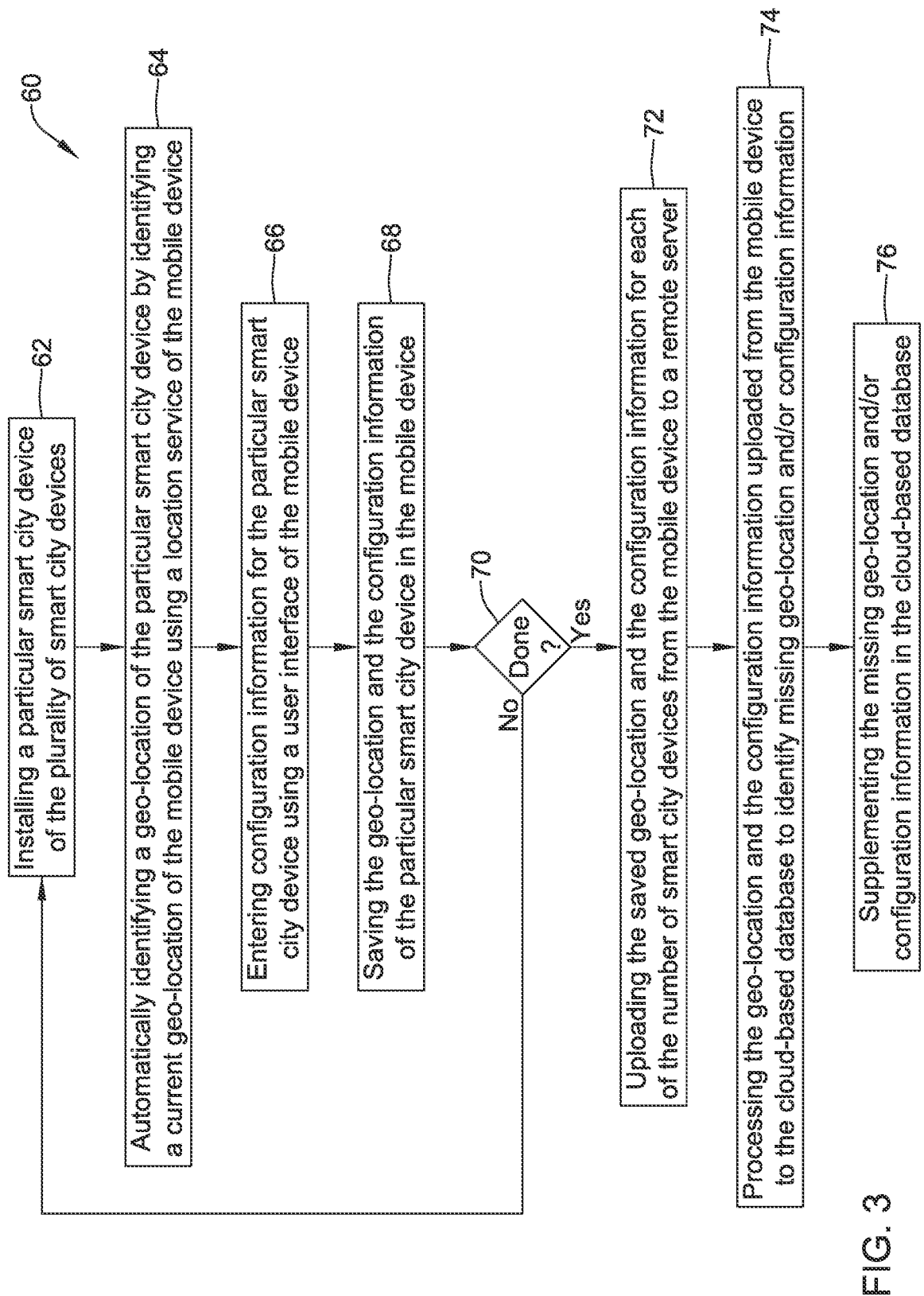
FIG. 3 is a flow diagram showing an illustrative method of configuring a plurality of smart city devices.

FIG. 3 is a flow diagram showing an illustrative method 60 of configuring a plurality of smart city devices (such as the smart city devices 14) using an application running on a mobile device (such as the mobile device 16). In some cases, at least some of the smart city devices may be security cameras or access control devices. The illustrative method 60 includes installing a particular smart city device of the plurality of smart city devices, as indicated at block 62. A geo-location of the particular smart city device is automatically identified by identifying a current geo-location of the mobile device using a location service of the mobile device, as indicated at block 64. The location services of the mobile device may use one or more of GPS, cellular triangulation, Bluetooth and Wi-Fi to identify the current geo-location of the mobile device, and thus the geo-location of the particular smart city device. In some cases, the geo-location is a GPS position.

Configuration information for the particular smart city device is entered using a user interface (such as the user interface 26) of the mobile device, as indicated at block 66. The geo-location and the configuration information of the particular smart city device are saved in the mobile device, as indicated at block 68. The configuration information for the particular smart city device may, for example, include one or more of a device name, a device type, a MAC address, an IP address, an installer note, an image upload from the particular smart city device, a video upload from the particular smart city device, an audio upload from the particular smart city device, a device specific test data, and one or more details regarding an installer of the particular smart city device.

At decision block 70, a determination is made as to whether all of the smart city devices have been configured. This determination may be made by the user, for example. If not, control reverts back to block 62 and the process continues with installation of another smart city device. However, if at decision block 70 the determination is made that all of the smart city devices have been configured, control passes to block 72, where the saved geo-location and the configuration information for each of the number of smart city devices are uploaded from the mobile device to a cloud-based database (such as the cloud-based database 32) that is accessible by the remote server (such as the remote server 18).

In some cases, the installing step (block 62), the automatically identifying step (block 64), the entering step (block 66) and the saving step (block 68) may be performed for each of the smart city devices before the remote server 18 (and/or the cloud-based database 32) is online or is otherwise available to receive the uploaded information. In some instances, the saved geo-location and the configuration information are uploaded to the cloud-based database 32 before moving on to the next smart city device. In some instances, the uploading step (block 72) occurs when the mobile device is connected to the remote server through a Wide Area Network (WAN). The plurality of smart city devices may be divided into a plurality of groups, with a different user assigned to each group, wherein each user uses a different mobile device for configuring each of the smart city devices within their assigned group, and the different users upload the saved geo-location and configuration information for each of their respective smart city devices to the cloud-based database.

The method 60 continues by processing the geo-location and the configuration information uploaded from the mobile device to the cloud-based database to identify missing geo-location and/or configuration information, as indicated at block 74. The missing geo-location and/or configuration information may be supplemented in the cloud-based database, as indicated at block 76. In some cases, the missing geo-location and/or configuration information may be highlighted for an operator to supplement the missing geo-location and/or configuration information in the cloud-based database. In some instances, the missing geo-location and/or configuration information may be identified via a machine learning engine (such as the machine learning engine 30). At least some of the missing geo-location and/or configuration information may be automatically supplemented via a machine learning engine.

Figure 4:
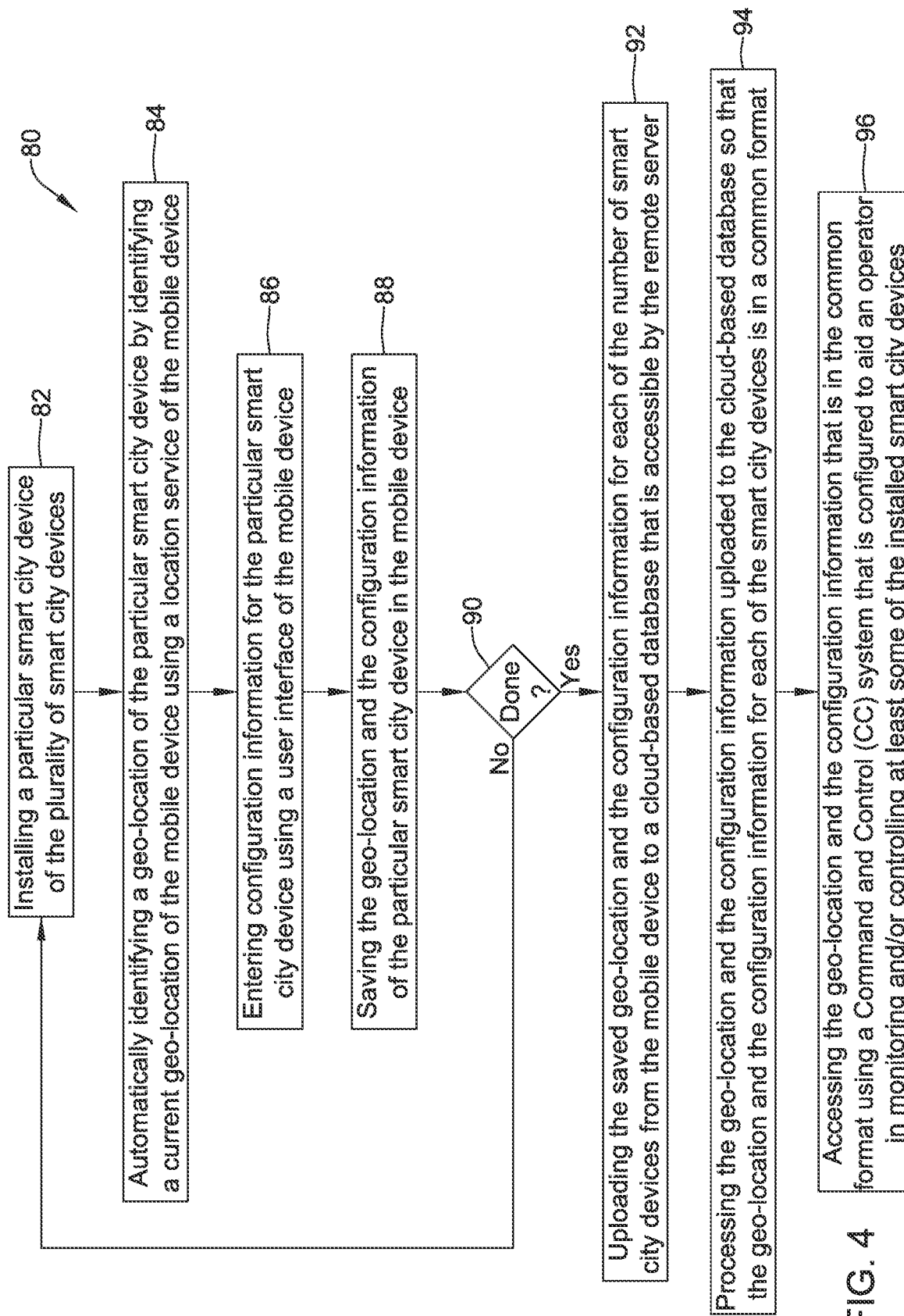
FIG. 4 is a flow diagram showing an illustrative method of configuring a plurality of smart city devices.

FIG. 4 is a flow diagram showing an illustrative method 80 of configuring a plurality of smart city devices (such as the smart city devices 14) using an application running on a mobile device (such as the mobile device 16). In some cases, at least some of the smart city devices may be security cameras or access control devices. The illustrative method 80 includes installing a particular smart city device of the plurality of smart city devices, as indicated at block 82. A geo-location of the particular smart city device is automatically identified by identifying a current geo-location of the mobile device using a location service of the mobile device, as indicated at block 84. The location services of the mobile device may use one or more of GPS, cellular triangulation, Bluetooth and Wi-Fi to identify the current geo-location of the mobile device, and thus the geo-location of the particular smart city device. In some cases, the geo-location is a GPS position.

Configuration information for the particular smart city device is entered using a user interface (such as the user interface 26) of the mobile device, as indicated at block 86. The geo-location and the configuration information of the particular smart city device are saved in the mobile device, as indicated at block 88. The configuration information for the particular smart city device may, for example, include one or more of a device name, a device type, a MAC address, an IP address, an installer note, an image upload from the particular smart city device, a video upload from the particular smart city device, an audio upload from the particular smart city device, a device specific test data, and one or more details regarding an installer of the particular smart city device.

At decision block 90, a determination is made as to whether all of the smart city devices have been configured. This determination may be made by the user, for example. If not, control reverts back to block 82 and the process continues with installation of another smart city device. However, if at decision block 90 the determination is made that all of the smart city devices have been configured, control passes to block 92, where the saved geo-location and the configuration information for each of the number of smart city devices are uploaded from the mobile device to a cloud-based database (such as the cloud-based database 32) that is accessible by the remote server (such as the remote server 18).

In some cases, the installing step (block 82), the automatically identifying step (block 84), the entering step (block 86) and the saving step (block 88) may be performed for each of the smart city devices before the remote server 18 (and/or the cloud-based database 32) is online or is otherwise available to receive the uploaded information. In some instances, the saved geo-location and the configuration information are uploaded to the cloud-based database 32 before moving on to the next smart city device. In some instances, the uploading step (block 92) occurs when the mobile device is connected to the remote server through a Wide Area Network (WAN). The plurality of smart city devices may be divided into a plurality of groups, with a different user assigned to each group, wherein each user uses a different mobile device for configuring each of the smart city devices within their assigned group, and the different users upload the saved geo-location and configuration information for each of their respective smart city devices to the cloud-based database.

The method 80 continues by processing the geo-location and the configuration information that was uploaded to the cloud-based database so that the geo-location and the configuration information, which for each of the smart city devices may be in any one of a plurality of formats (e.g. Plain text file, CSV file, Custom format, Json/xml, etc.), is in a common format, as indicated at block 94. The geo-location and the configuration information, now in a common format (e.g. Json/xml), may be accessed using a Command and Control (CC) system (such as the CC system 10) that is configured to aid an operator in monitoring and/or controlling at least some of the installed smart city devices.

Figure 5:
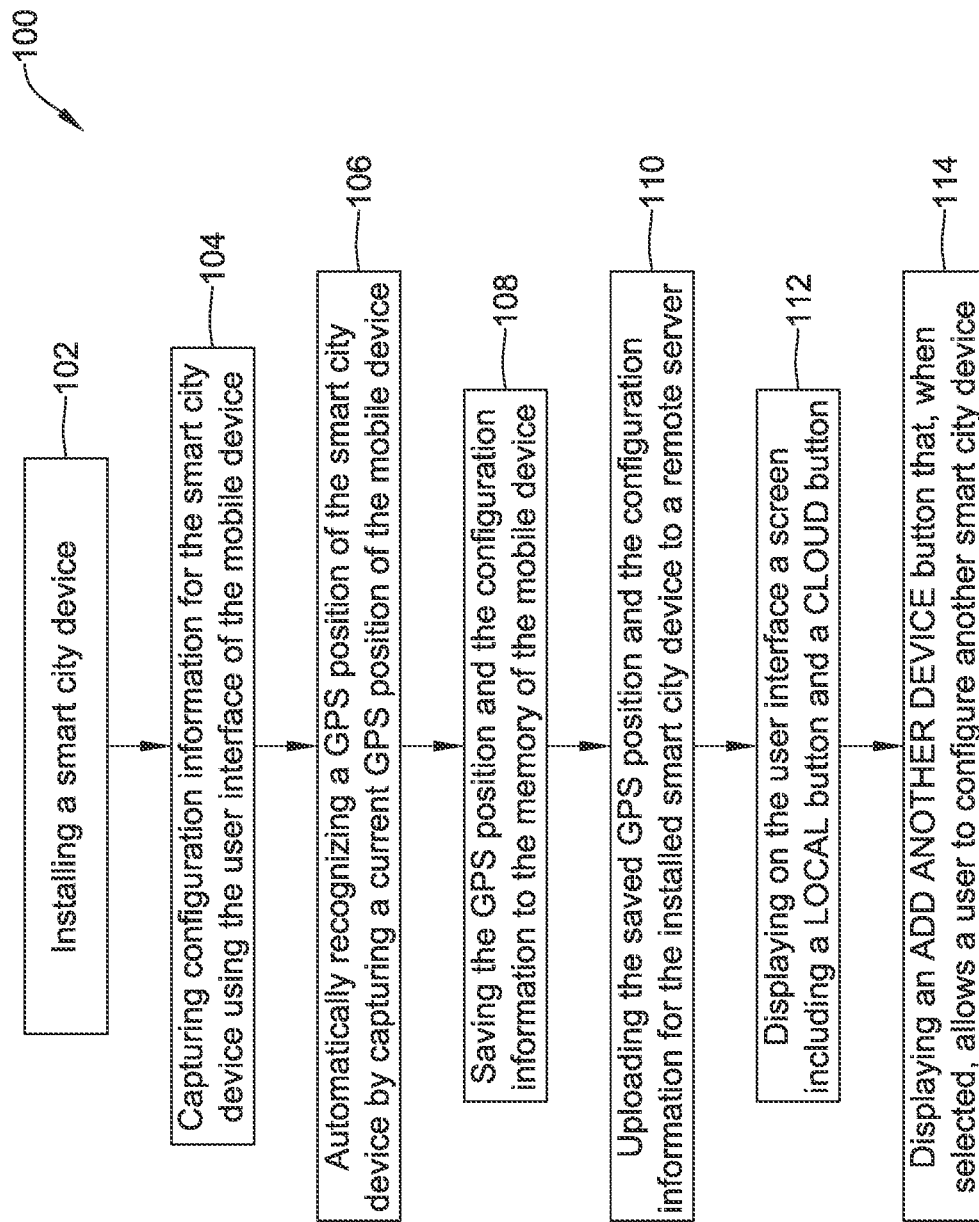
FIG. 5 is a flow diagram showing an illustrative method of configuring a plurality of smart city devices.

FIG. 5 is a flow diagram showing an illustrative method 100 of configuring a smart city device (such as the smart city device 14) using an application running on a mobile device (such as the mobile device 16), where the mobile device includes a user interface (such as the user interface 26) and a memory (such as the memory 22). A smart city device is installed, as indicated at block 102. Configuration information for the smart city device is captured using the user interface of the mobile device, as indicated at block 104. A GPS position of the smart city device is automatically recognized by capturing a current GPS position of the mobile device, as indicated at block 106. The GPS position and the configuration information are saved to the memory of the mobile device, as indicated at block 108. The saved GPS position and the configuration information for the installed smart city device are uploaded to a remote server (such as the remote server 18), as indicated at block 110.

In some instances, automatically capturing the GPS position of the mobile device (block 106) may include displaying on the user interface of the mobile device a map that includes a pointer indicating a current position of the mobile device and allowing a user to adjust a position of the pointer, relative to the map, when the displayed position of the pointer is not accurate. The method 100 may include capturing the GPS position of the mobile device based upon the displayed position (which may have been corrected) of the pointer. This is illustrated, for example, in FIG. 7. In some cases, capturing configuration information for the smart city device (block 104) using the user interface may include displaying a screen that allows a user to enter a parameter and parameter value pair, and then accepting an inputted name for the parameter and a parameter value for the parameter. This is illustrated, for example, in FIG. 8.

In some cases, and as indicated at block 112, the method 100 may further include displaying on the user interface a screen that includes a LOCAL button and a CLOUD button. When the LOCAL button is selected, the GPS position and the configuration information for the smart city device may be saved to the memory of the mobile device. When the CLOUD button is selected, the GPS position and the configuration information for the smart city device may be uploaded to a cloud-based database (such as the cloud-based database 32). In some cases, the method 100 may further include displaying an ADD ANOTHER DEVICE button that, when selected, allows a user to configure another smart city device. The user may select the ADD ANOTHER DEVICE button once they have completed configuration of a smart city device by selecting either the LOCAL button or the CLOUD button. These features are illustrated, for example, in FIG. 9.

Figure 6:
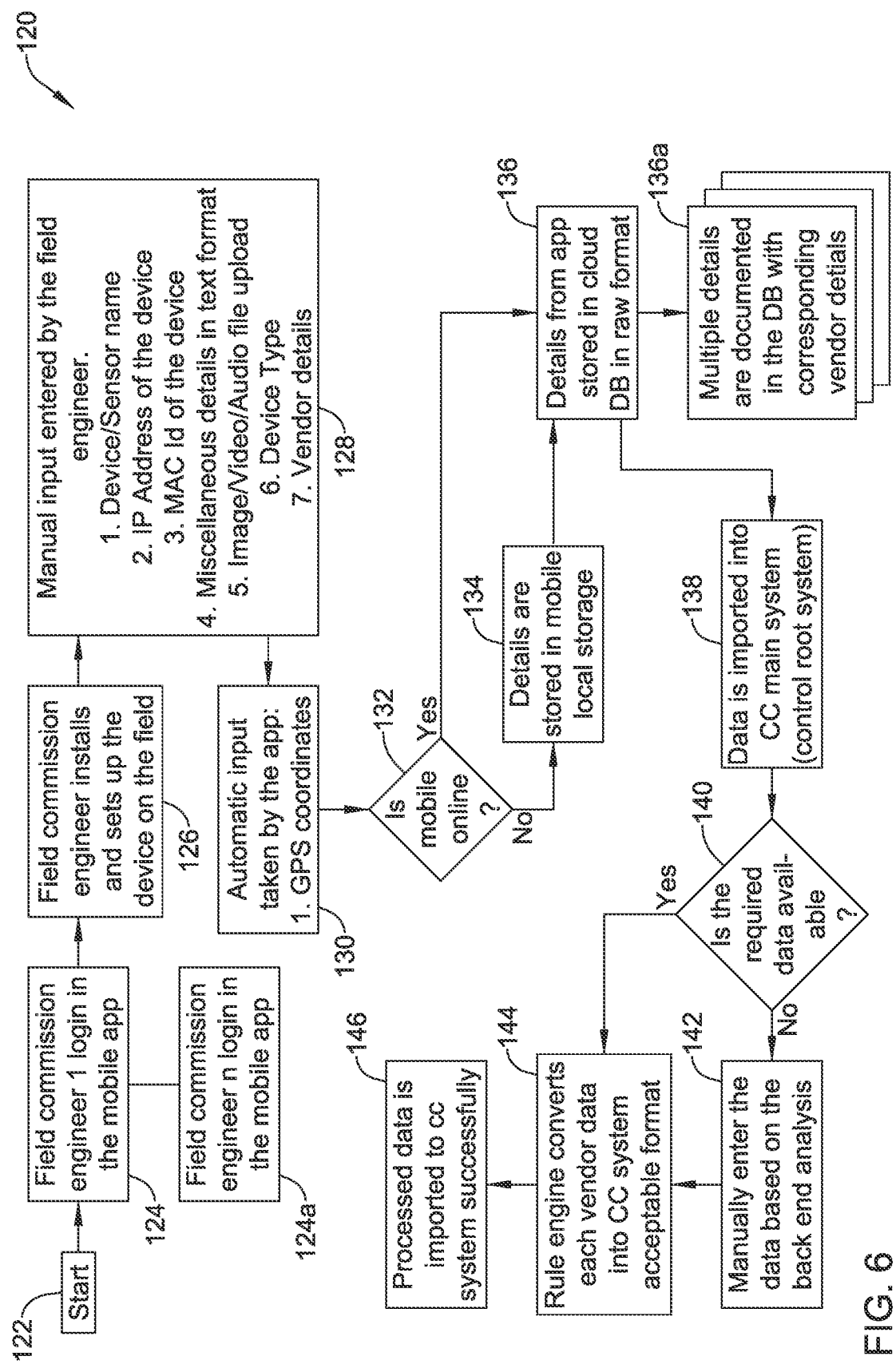
FIG. 6 is a flow diagram showing an illustrative method of configuring a plurality of smart city devices.

FIG. 6 is a flow diagram showing an illustrative method 120 for installing and configuring one or more smart city devices. The illustrative method 120 begins at a start point 122. At block 124, a user such as but not limited to a field commission engineer logs in to an application on their mobile device. As indicated, any number 'n' of field commission engineers can simultaneously work on installing and commissioning smart city devices, as indicated by field commission engineer # n logging in at block 124a. While the remainder of the method 120 will for simplicity be discussed with respect to a single field commission engineer, it should be recognized that a number of field commission engineers can be carrying out each of the described method as they move about the city installing and configuring smart city devices. The field commission engineer installs and sets up a smart city device, as indicated at block 126.

Next, the field commission engineer manually enters a number of different configuration information into the mobile device, as indicated at block 128. The configuration information may include any information necessary for the CC system 10 to be able to appropriately communicate with the particular smart city device, learn how to recognize information from the particular smart city device as well as how to (optionally) control operation of the particular smart city device. Examples include but are not limited to a name of the smart city device, a type of the smart city device, a model number of the smart city device, an IP address of the smart city device, a MAC id of the smart city device, upload of any appropriate image files, video files and/or audio files, device type and vendor details. At block 130, the application running on the mobile device automatically captures the GPS coordinates of the smart city device.

At decision block 132, a determination is made as to whether the mobile device is online. If the mobile device is offline, control passes to block 134 where the configuration information that was inputted by the field commission engineer as well as the captured GPS coordinates for that particular smart city device are saved in the memory of the mobile device. However, if the mobile device is online, control passes to block 136 and the configuration information that was inputted by the field commission engineer as well as the captured GPS coordinates for that particular smart city device are uploaded to a cloud-based database (such as the cloud-based database 32) in a raw format. It will be appreciated that, as indicated at block 136a, a variety of different details, including vendor details (e.g. vendor whose field commission engineer installed the particular smart city device), may be included in the information uploaded to the cloud-based database. It will be appreciated that once the mobile device is online, any locally saved configuration information and captured GPS coordinates will synch to the cloud-based database.

At decision block 140, a determination is made as to whether the required data is available. This determination may be made by the remote server 18, and in some instances may include the machine learning engine 30. If the required data is not available, control passes to block 142 and any missing information can be manually entered (or automatically entered via the machine learning engine 30). Once the missing information has been entered, or if at decision block 140 a determination was made that all needed information is present, control passes to block 144 where a rules engine converts each vendor's data into an acceptable format for use by the CC system 10. The processed data is then imported into the CC system 10, as indicated at block 146. In some cases, the machine learning engine 30 may be useful in determining which information is missing. As an example, if a camera device does not have an IP address or the camera device lacks credential data, these fields can be highlighted by the system. In some cases, machine learning-based automated device normalization can be enabled. For example, a vendor (e.g. one of the vendors that employs field commission engineers to install the smart city devices) can provide data in x format and the system can automatically convert the data into y format.

Figure 7:
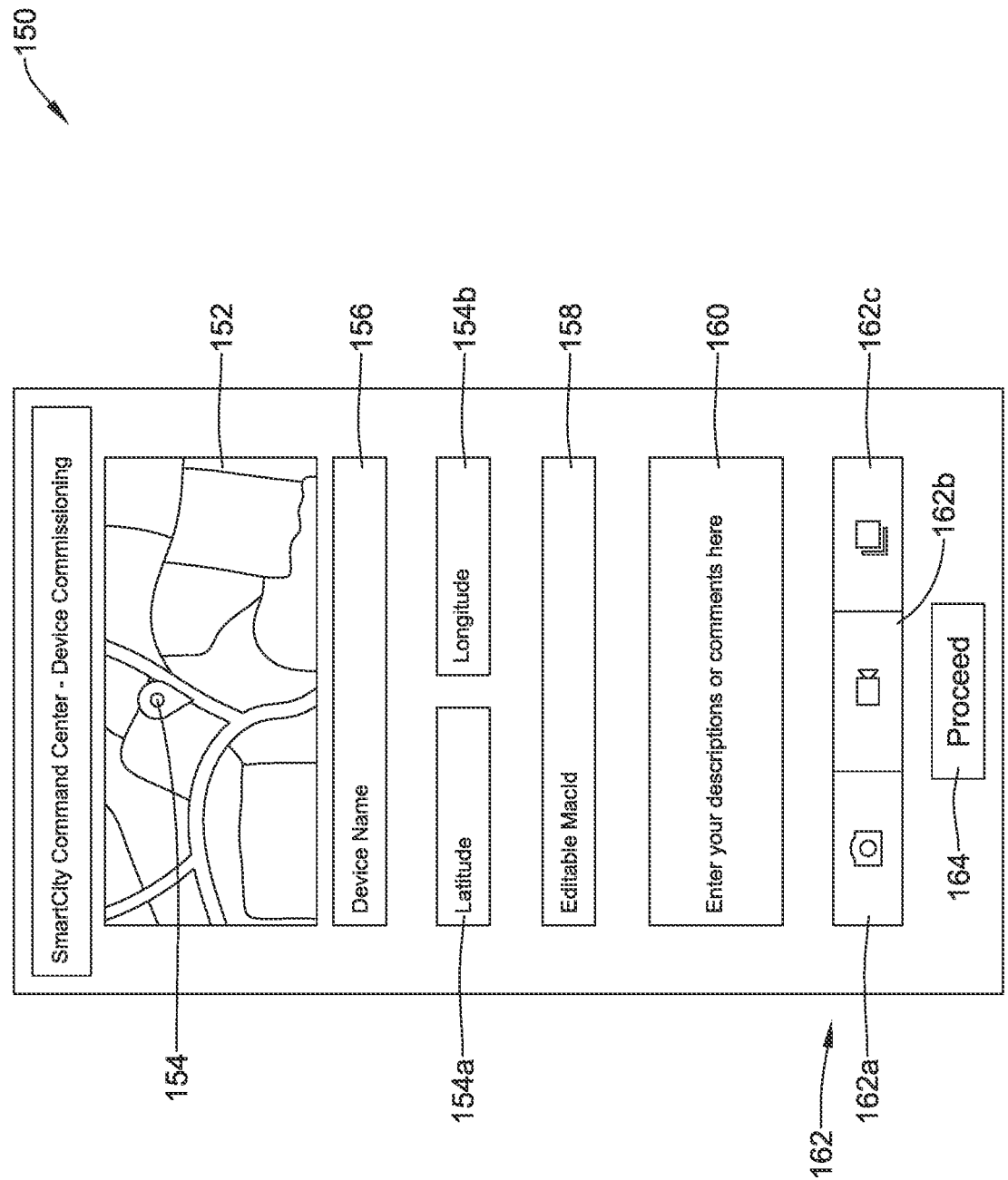
FIGS. 7 through 9 show screen shots from an illustrative application running on a mobile device.
Figure 8:
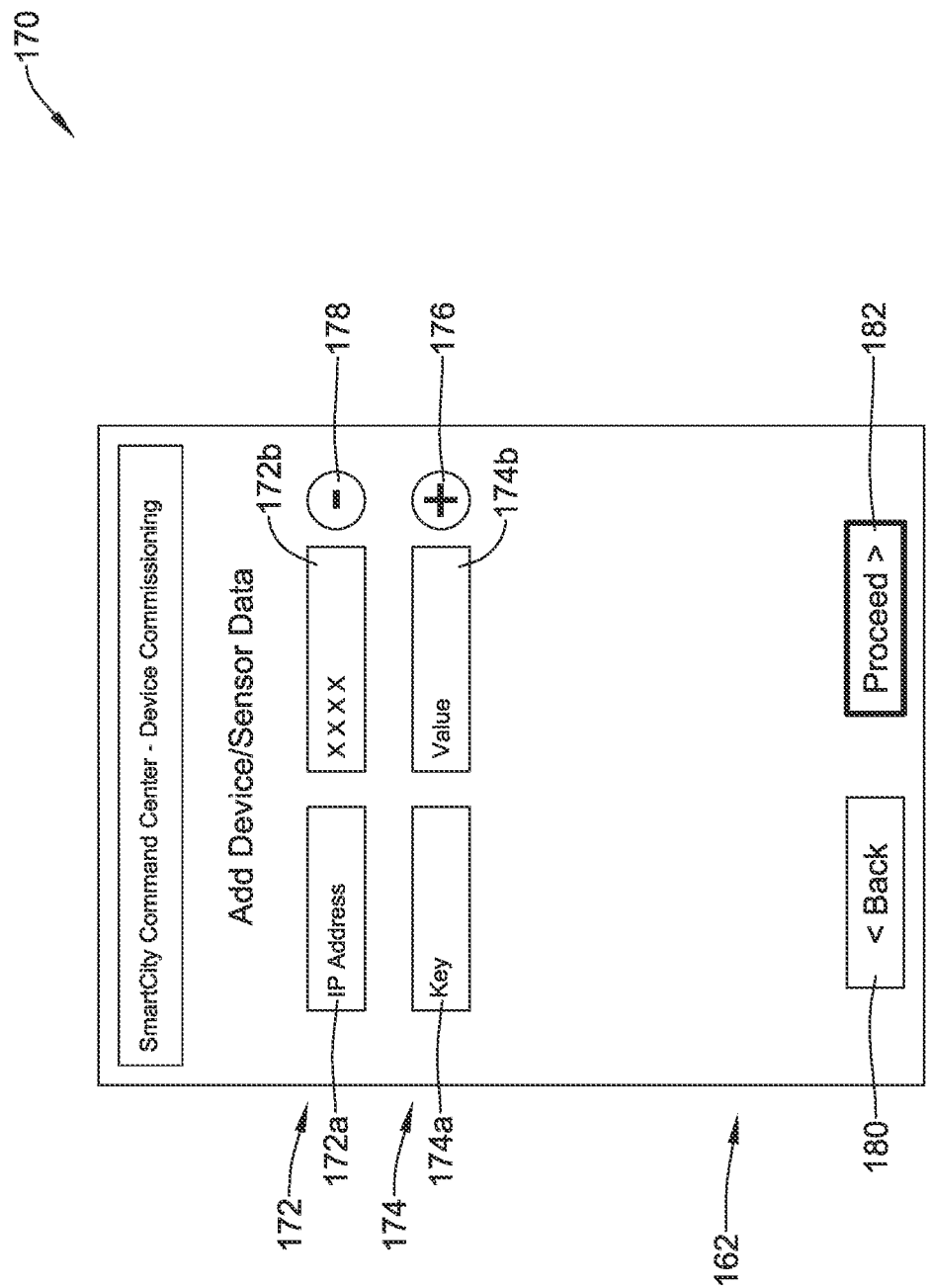
Figure 9:
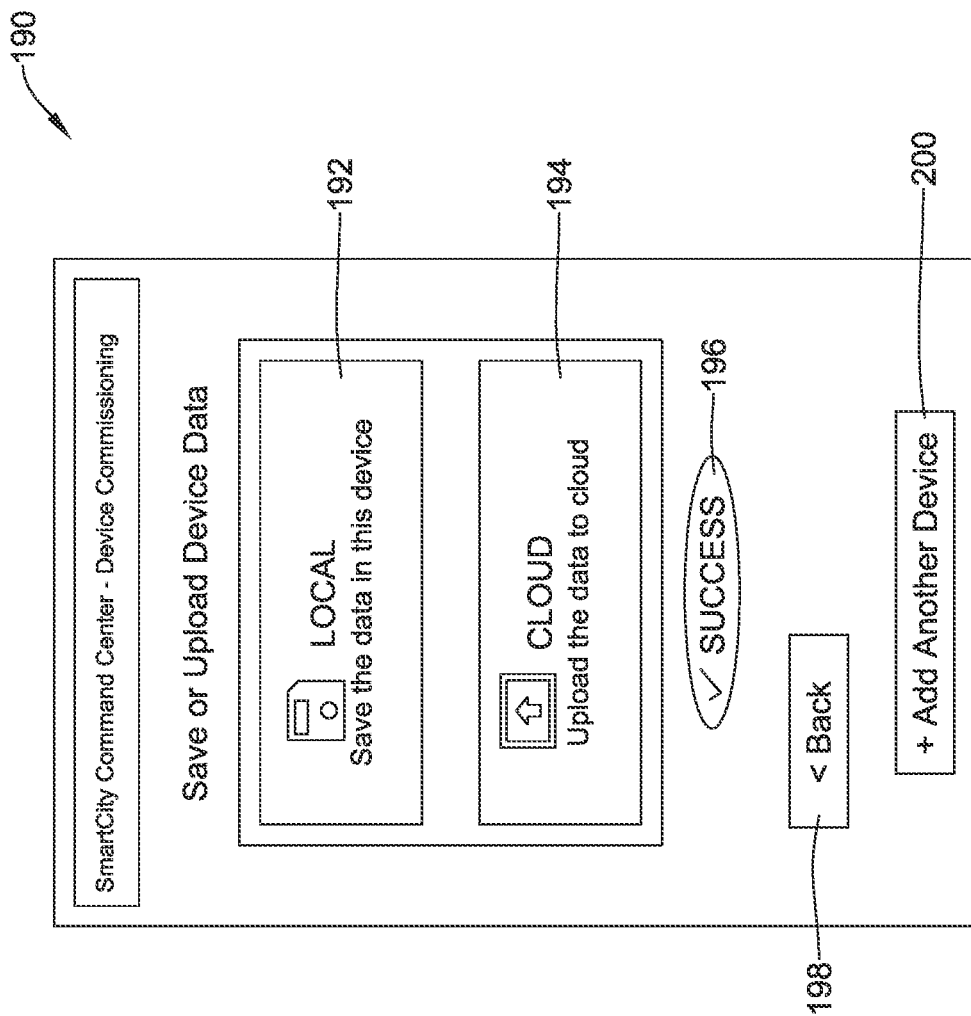

FIGS. 7 through 9 show screen shots from an illustrative application running on a mobile device. FIG. 7 shows a screen 150, which may be considered a start screen. The screen 150 includes a map 152 that shows an area immediately around where a particular smart city device is to be installed or has already been installed and is awaiting configuration. The map 152 includes a pointer 154 that indicates the current location of the mobile device relative to the map 152. If the user believes that the current location is not correctly indicated, they can adjust the position of the pointer 154 relative to the map 152 such that the application will capture the adjusted position. GPS coordinates corresponding to the position of the pointer 154 (whether adjusted or not) will show up in boxes 154a (latitude) and 154b (longitude).

A device name box 156 allows the user to enter a device name for the particular smart city device. The device name may be created by the user (e.g. field commission engineer). In some instances, the device name may auto-populate, based perhaps on the current location and a mapping of planned device locations stored in the mobile device. A MAC id box 158 may show an auto-generated value that can be overridden by the user, if appropriate. In some cases, the MAC id may be auto-populated by scanning a bar-code on the particular smart device and/or downloading the MAC id from the particular smart device via a Bluetooth, Wi-Fi or other connection. A comments box 160 allows the user to enter any appropriate comments. A toolbar 162 allows a user to add attachments by capturing a picture (162a), a video (162b) or add any attachments from the device (162c). A proceed button 164, if selected, allows the user to move to a next screen.

FIG. 8 shows a screen 170 that allows the user to add configuration information for the particular smart city device they are currently configuring. It will be appreciated that the configuration information may be added as parameter and parameter value pairs. To illustrate, a first pair 172 includes a parameter name 172a (IP address) and a parameter value 172b (X.X.X.X). A second pair 174 includes a parameter name 174a (key) and a parameter value 174b (value). Additional pairs can be added by selecting PLUS button 176. A pair can be removed by highlighting the pair and selecting MINUS button 178. A BACK button 180 allows the user to revert to a previous screen such as the screen 150 while a PROCEED button 182 allows the user to move to a subsequent screen.

FIG. 9 shows a screen 190 that allows the user to save the configuration information locally on the mobile device or to upload the configuration information. The screen 190 includes a LOCAL button 192 and a CLOUD button 194. By selecting the LOCAL button 192, the application running on the mobile device will save the configuration information, including the GPS position, locally within memory of the mobile device itself for subsequent uploading to the cloud. By selecting the CLOUD button 194, the application running on the mobile device is caused to upload the device data to the cloud. It is contemplated that if the mobile device is offline, the CLOUD button 194 may be grayed out as being unavailable.

The screen 190 includes a message 196 (Success) that informs the user that the data was either successfully locally saved (if the LOCAL button 192 was selected) or was successfully uploaded to the cloud (if the CLOUD button 194 was selected). If there was a problem, the message 196 may instead display "Error", or any other appropriate message. In this case, the user may be able to try again, or to try changing their selection. If they had originally selected the CLOUD button 194, they could try again to upload to the cloud, or they could change their selection and instead select the LOCAL button 192. This is just an example.

A back button 198, if selected, allows the user to revert to a previous screen such as the screen 150 or the screen 170. An ADD ANOTHER DEVICE button 200 allows the user to be done with the particular smart city device they have been working on, and to move on to another smart city device. The application running on the mobile device may then revert to a start screen (screen 150 as shown in FIG. 7) for configuring the next smart city device. The next smart city device may be close by, or the next smart city device may be in another part of the city.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of configuring a plurality of smart city devices using an application running on a mobile device, the mobile device including a user interface and a memory, the method comprising:
    installing a particular smart city device of the plurality of smart city devices;
    automatically identifying a geo-location of the particular smart city device by identifying a current geo-location of the mobile device using a location service of the mobile device;
    entering configuration information for the particular smart city device using a user interface of the mobile device;
    saving the geo-location and the configuration information of the particular smart city device in the mobile device;
    repeating the installing, entering, recognizing and storing steps for each of a number of the plurality of smart city devices;
    uploading the saved geo-location and the configuration information for each of the number of smart city devices from the mobile device to a cloud-based database that is accessible by a remote server; and
    wherein the plurality of smart city devices are divided into a plurality of groups, with a different user assigned to each group, wherein each user uses a different mobile device for configuring each of the smart city devices within their assigned group, and the different users upload the saved geo-location and configuration information for each of their respective smart city devices to the cloud-based database.

2. The method of claim 1, wherein the geo-location is a GPS position.

3. The method of claim 1, wherein the location service of the mobile device uses one or more of GPS, cellular triangulation, Bluetooth and Wi-Fi to identify the current geo-location of the mobile device, and thus the geo-location of the particular smart city device.

4. The method of claim 1, wherein the uploading step occurs when the mobile device is connected to the remote server through a Wide Area Network (WAN).

5. The method of claim 1, wherein the geo-location and the configuration information for each of the smart city devices is stored in the cloud-based database in one of a plurality of formats, and wherein the remote server is configured to process the geo-location and the configuration information uploaded to the cloud-based database so that the geo-location and the configuration information for each of the smart city devices is in a common format.

6. The method of claim 5, further comprising accessing the geo-location and the configuration information that is in the common format using a Command and Control (CC) system that is configured to aid an operator in monitoring and/or controlling at least some of the installed smart city devices.

7. The method of claim 1, further comprising:
    processing the geo-location and the configuration information uploaded from the mobile device to the cloud-based database to identify missing geo-location and/or configuration information; and
    supplementing the missing geo-location and/or configuration information in the cloud-based database.

8. The method of claim 7, wherein the missing geo-location and/or configuration information is highlighted for an operator to supplement the missing geo-location and/or configuration information in the cloud-based database.

9. The method of claim 7, wherein the missing geo-location and/or configuration information is identified via a machine learning engine.

10. The method of claim 7, wherein at least some of the missing geo-location and/or configuration information is automatically supplemented via a machine learning engine.

11. The method of claim 1, wherein at least some of the plurality of smart city devices comprise one or more of security cameras and access control devices.

12. The method of claim 1, wherein the configuration information for the particular smart city device comprises one or more of a device name, a device type, a MAC address, an IP address, an installer note, an image upload from the particular smart city device, a video upload from the particular smart city device, an audio upload from the particular smart city device, a device specific test data, and one or more details regarding an installer of the particular smart city device.

13. A method of configuring a smart city device using an application running on a mobile device, the mobile device including a user interface and a memory, the method comprising:
    installing a smart city device;
    manually entering or overriding by a user configuration information for the smart city device using a user interface (UI) screen displayed on the user interface of the mobile device, wherein the configuration information includes one or more of a device name, a device type, an IP address, an installer note, test data associated with the smart city device, and one or more details regarding an installer of the smart city device;

automatically recognizing a GPS position of the smart city device by capturing a current GPS position of the mobile device;

wherein automatically capturing the GPS position of the mobile device comprises:

displaying on the user interface of the mobile device a map that includes a pointer indicating a current position of the mobile device; allowing a user to adjust a position of the pointer, relative to the map, when the displayed position of the pointer is not accurate;

and capturing the GPS position of the mobile device based upon the displayed position of the pointer;

saving the GPS position and the configuration information to the memory of the mobile device; and uploading the saved GPS position and the configuration information for the installed smart city device to a remote server.

14. The method of claim 13, wherein capturing configuration information for the smart city device using the user interface comprises:

displaying a screen that allows a user to enter a parameter and parameter value pair; and accepting an inputted name for the parameter and a parameter value for the parameter.

15. The method of claim 13, further comprising displaying on the user interface a screen including a LOCAL button and a CLOUD button, where:

selecting the LOCAL button causes the GPS position and the configuration information for the smart city device to be saved to the memory of the mobile device; and selecting the CLOUD button causes the GPS position and the configuration information for the smart city device to be uploaded to a cloud-based database.

16. The method of claim 13, further comprising displaying an ADD ANOTHER DEVICE button that, when selected, allows a user to configure another smart city device.

17. A method of configuring a plurality of smart city devices using an application running on a mobile device, the mobile device including a user interface and a memory, the method comprising:

installing a particular smart city device of the plurality of smart city devices;

automatically identifying a geo-location of the particular smart city device by identifying a current geo-location of the mobile device using a location service of the mobile device;

wherein automatically capturing a GPS position of the mobile device comprises:

displaying on the user interface of the mobile device a map that includes a pointer indicating the current position or geo-location of the mobile device; allowing a user to adjust a position of the pointer, relative to the map, when the displayed position of the pointer is not accurate; and capturing the GPS position of the mobile device based upon the displayed position of the pointer;

entering configuration information for the particular smart city device using a user interface of the mobile device, wherein the configuration information includes one or more of a device name, a device type, a MAC address, an IP address, an installer note, an image upload from the particular smart city device, a video upload from the particular smart city device, an audio upload from the particular smart city device, a device specific test data, and one or more details regarding an installer of the particular smart city device;

saving the geo-location and the configuration information of the particular smart city device in the mobile device;

repeating the installing, entering, recognizing and storing steps for each of a number of the plurality of smart city devices; and uploading the saved geo-location and the configuration information for each of the number of smart city devices from the mobile device to a remote server.

* * * * *